United States Patent [19]
Larsen et al.

[11] Patent Number: 6,157,514
[45] Date of Patent: Dec. 5, 2000

[54] METHOD AND APPARATUS FOR READ-WRITE PROTECTION

[75] Inventors: Troy Larsen, North Ogden; Jason Dewey, Ogden; Weimin Pan, Ogen, all of Utah

[73] Assignee: Iomega Corporation, Roy, Utah

[21] Appl. No.: 08/968,561

[22] Filed: Nov. 12, 1997

[51] Int. Cl.⁷ .................................................. G11B 17/02
[52] U.S. Cl. ......................................................... 360/99.06
[58] Field of Search .............................. 360/99.02, 99.06, 360/105, 99.07, 99.03, 133; 369/75.2, 77.1, 77.2

[56] References Cited

U.S. PATENT DOCUMENTS

| | | | |
|---|---|---|---|
| 5,481,420 | 1/1996 | Cardona et al. | 360/99.06 |
| 5,943,186 | 8/1999 | Muse | 360/99.06 |

FOREIGN PATENT DOCUMENTS

| | | |
|---|---|---|
| 59-127256 | 7/1984 | Japan . |
| 3-73465 | 3/1991 | Japan . |
| 7-44963 | 2/1995 | Japan . |
| 8-249845 | 9/1996 | Japan . |

*Primary Examiner*—William R. Korzuch
*Attorney, Agent, or Firm*—Woodcock Washburn Kurtz Mackiewicz & Norris LLP

[57] ABSTRACT

A method and apparatus for protecting against overwrite and misread errors caused by cartridge movement comprises a read/write head and a read-write protection switch in electrical communication with the read-write head. The read-write protection switch generates an electrical signal upon movement of the media cartridge that disables the read/write head. A method of misread and overwrite protection comprises: detecting movement of the cartridge shell; disabling read/write heads; identifying whether the media drive was in the process of reading from or writing to the media cartridge; if the media drive was writing to the storage medium when the cartridge shell is moved, generating a write fault interrupt; and if the media drive is reading from the storage medium when the cartridge shell is moved, generating a read fault interrupt. A removable media cartridge has a push member and an abutment surface.

24 Claims, 17 Drawing Sheets

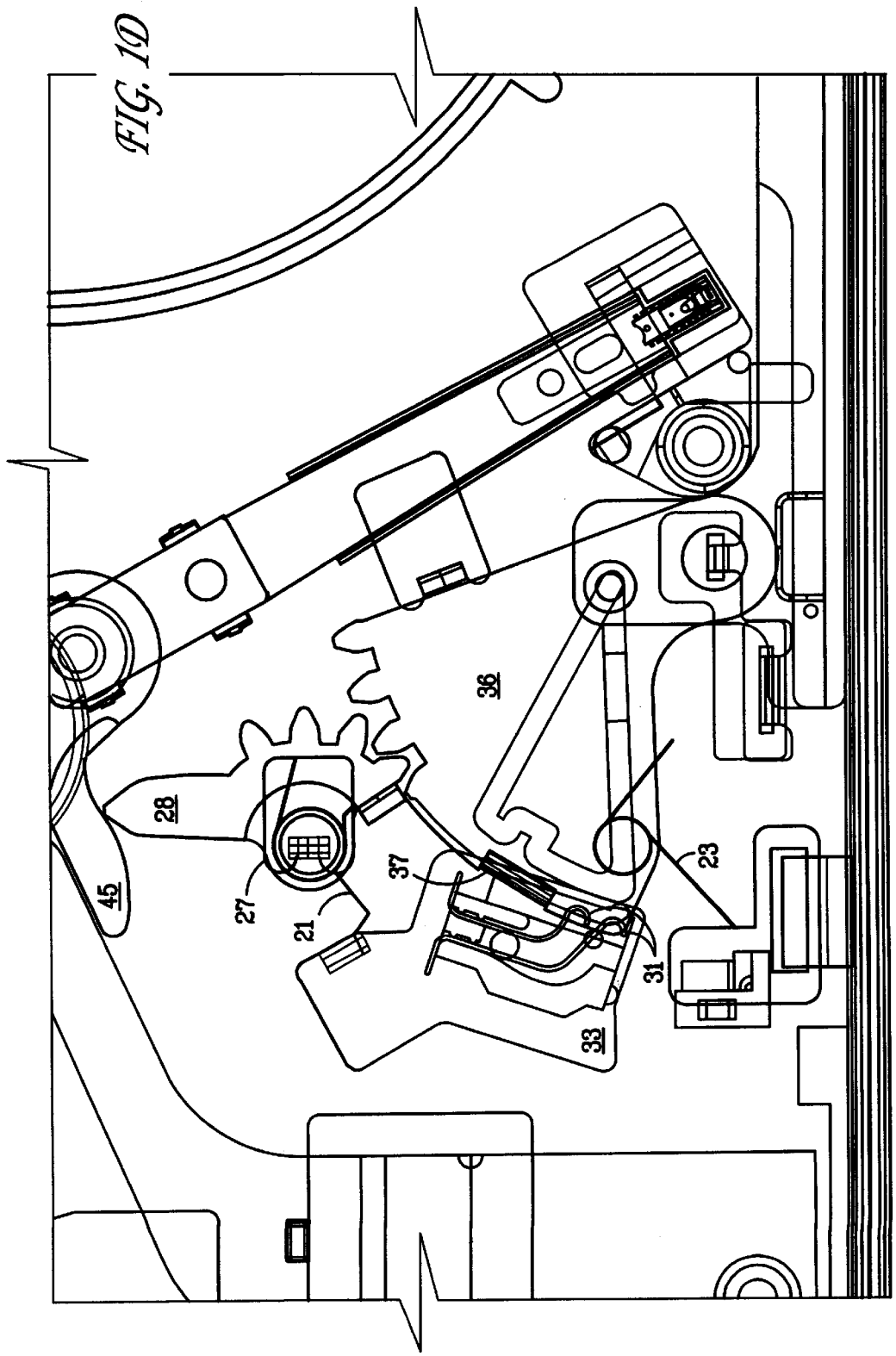

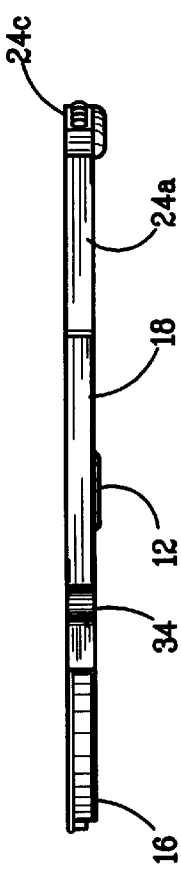
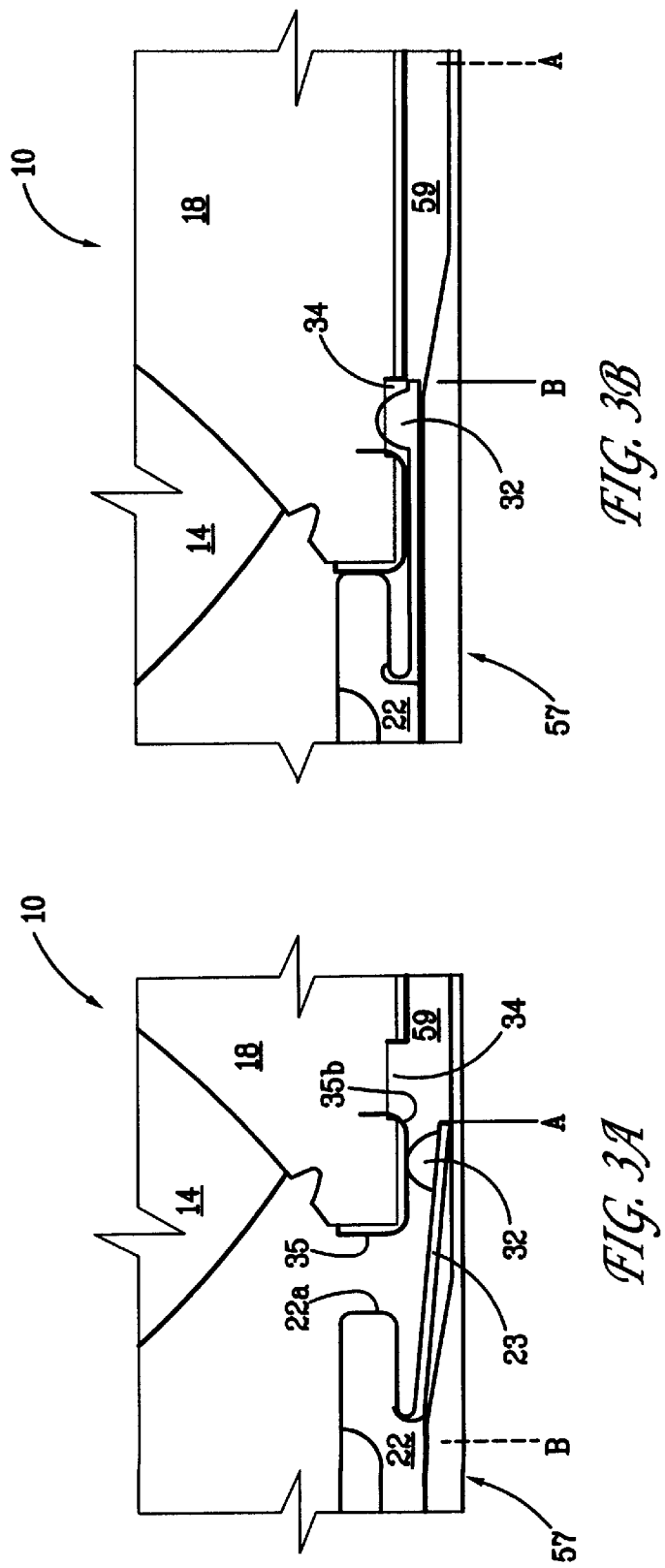

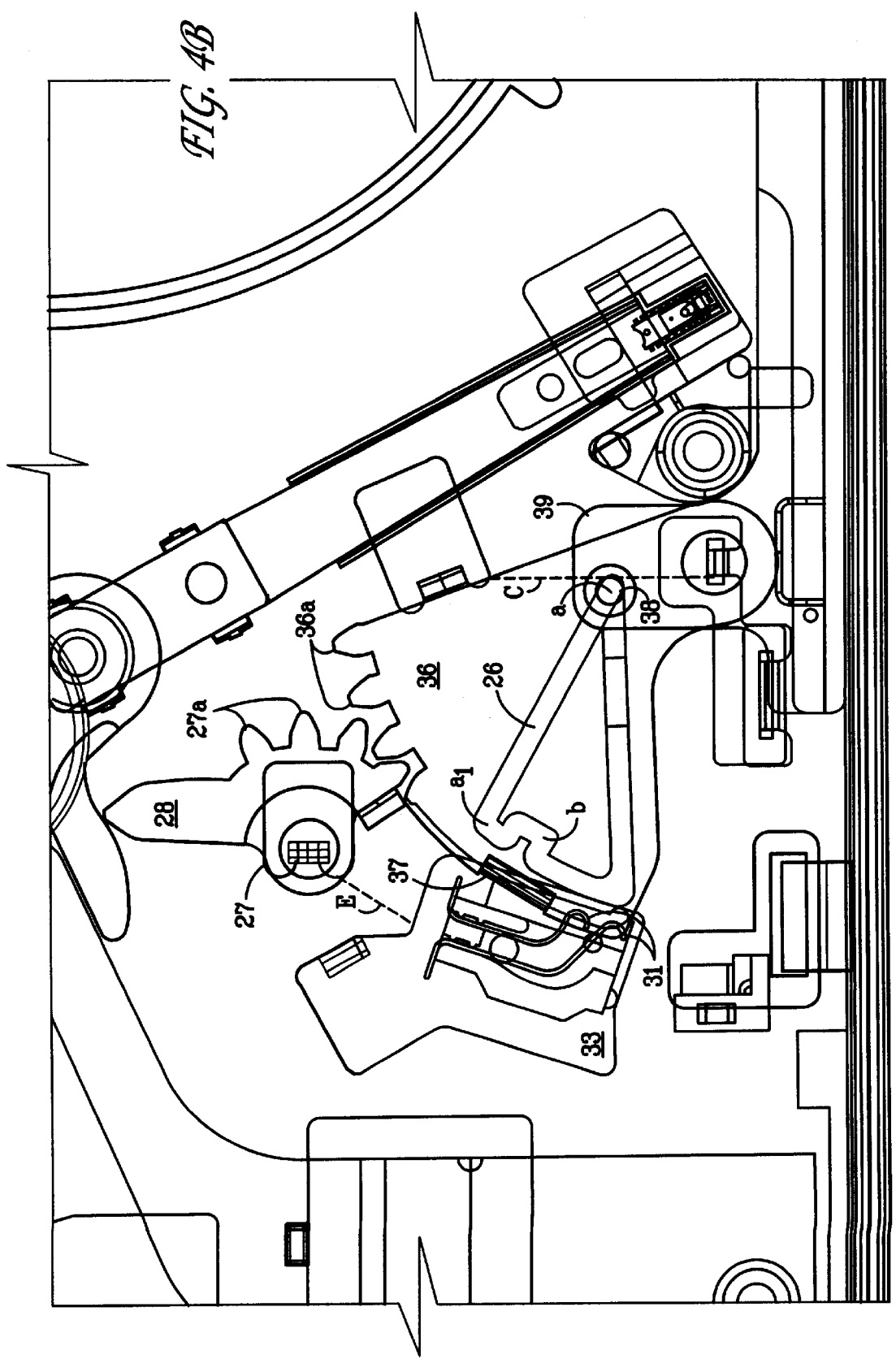

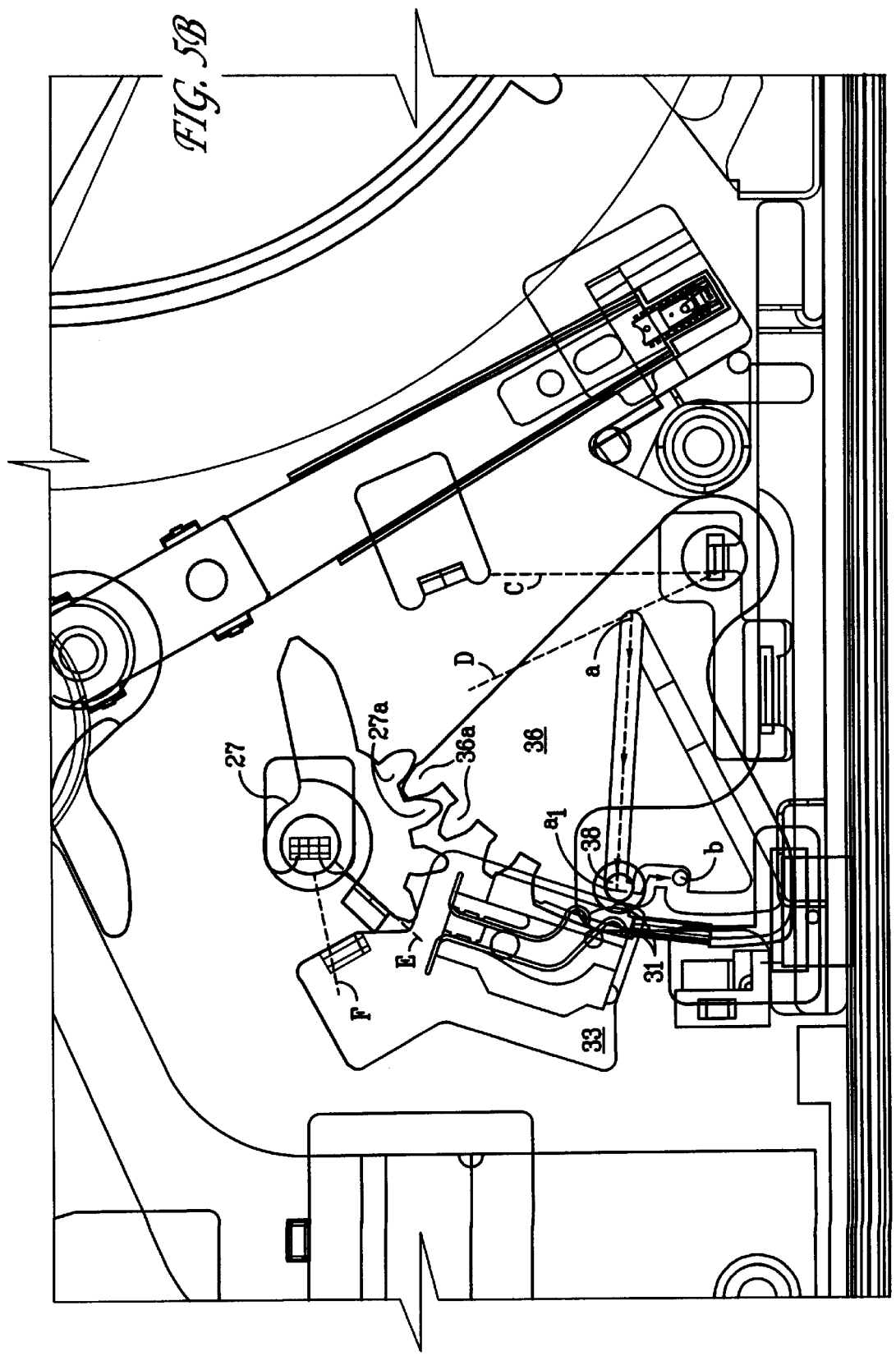

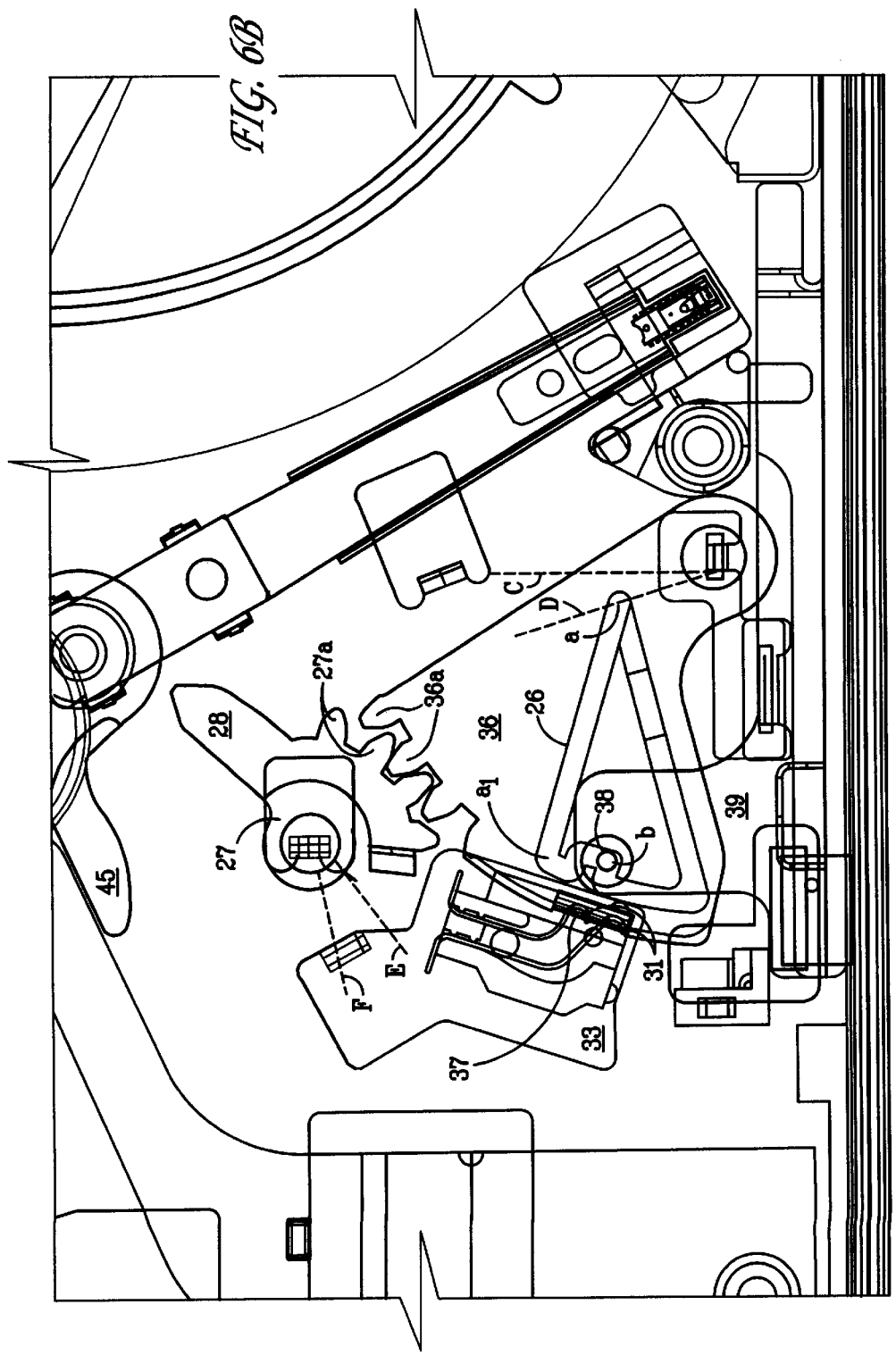

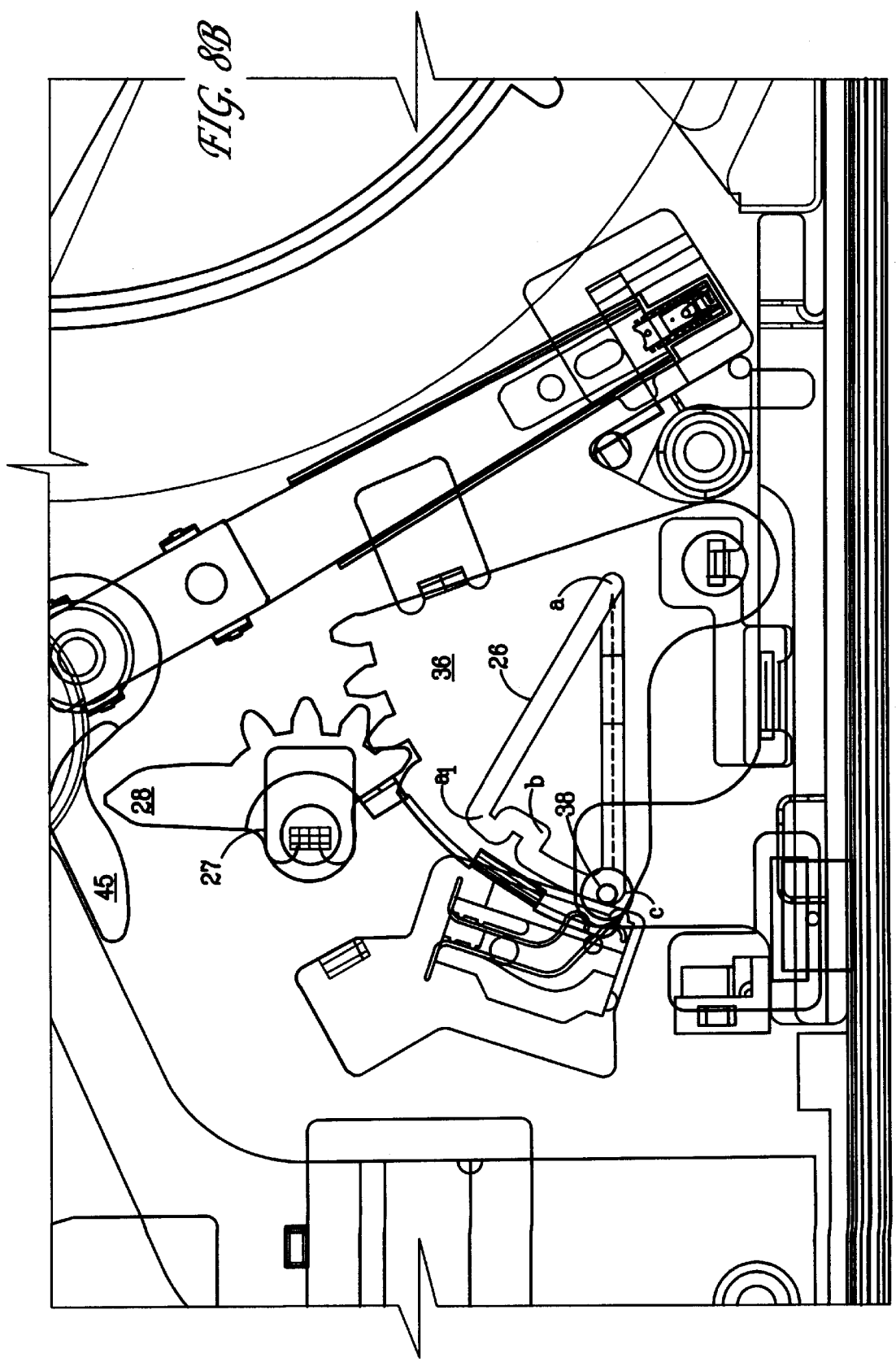

METHOD AND APPARATUS FOR READ-WRITE PROTECTION

BACKGROUND OF THE INVENTION

This invention relates to cartridge based data storage systems. More particularly, the invention relates to the loading and ejection of a disk cartridge to and from a disk drive.

Cartridge based tape and disk data storage devices for storing digital electronic information have been in use in the computer industry for several decades. Removable disk cartridges typically comprise an outer casing or shell that houses a disk-shaped magnetic, magneto-optical or optical storage medium upon which information can be stored. The cartridge shell often comprises upper and lower halves that are formed of injection molded plastic and are joined together to house the disk. Magnetic disk media can be either rigid or flexible and are mounted on a hub that rotates freely within the cartridge. When the cartridge is inserted into a disk drive, a spindle motor in the drive engages the disk hub in order to rotate the disk within the cartridge at a given speed. The outer shell of the cartridge typically has a media access opening proximate one edge to provide the recording heads of the drive with access to the disk. A shutter or door mechanism is provided to cover the head access opening when the cartridge is not in use to prevent dust or other contaminants from entering the cartridge and settling on the recording surface of the disk. The shutter is commonly biased to a closed position with a spring bias. To open the shutter and gain access to the media, the drive employs a mechanism that overcomes the bias of the spring.

Disk drives for use with such removable disk cartridges typically employ either a linear actuator mechanism or a radial arm actuator mechanism for positioning the read/write head(s) of the disk drive on the recording surface(s) of the storage medium, or disk. Because the disk cartridges are designed to be removable from the drive, the linear or radial arm actuators must be able to move off, and away from, the storage medium to a retracted position in order to prevent damage to the head(s) when a cartridge is inserted and removed from the disk drive. Moreover, many removable cartridge disk drives employ a pair of opposing read/write heads for recording and reproducing information on both sides of a storage medium. Typically, the opposing heads are disposed on flexible suspension arms at the distal end of an actuator that allow the heads to fly closely over the respective surfaces of the rotating disk.

Disk drives also require a mechanism for allowing the heads to load only after a cartridge is inserted into the drive. The actuator that carries the recording heads of the disk drive across the recording surfaces of the disk should not be allowed to move unless a disk cartridge is present. In the prior art, mechanical or electrical switches are typically employed to determine the presence of a disk cartridge within the drive. Such switches are typically positioned so that when a disk cartridge is inserted fully into the drive, the cartridge contacts the switch, thereby providing an indication that the disk cartridge is present.

When a user has completed the use of a disk cartridge, a mechanism must be provided to eject the disk cartridge from the drive and substantially simultaneously ensure that the read/write heads are retracted from the disk into a predetermined safe position so as to prevent any damage to the read/write heads. Typically, a tray or spring loaded lever is used to push the cartridge out of the drive. The spring loaded tray or lever is often coupled to the head protection mechanism so that the head protection occurs in unison with cartridge ejection. Ejection of the cartridge from the drive is most often effected by pressing a button located on the exterior of the drive. Depressing such a button signals the drive to retract the read/write heads from the media and eject the media cartridge.

There is trend in the art to reduce the size of storage media drives and cartridges. The mechanisms for ejecting a media cartridge and the linkage to the head retraction require additional disk drive space which runs counter to the movement to reduce the overall size of the drive. Furthermore, the surface area on the exterior of a storage media drive is limited, with little room available for eject buttons to effect the removal of a cartridge from the media drive.

Therefore, there is a need for an intuitive method and apparatus for ejecting a cartridge from a drive that protects against reading and writing errors which may occur when the cartridge is moved while the drive is reading or writing.

SUMMARY OF THE INVENTION

Accordingly, it is the general object of the current invention to provide a method and apparatus for ejecting a cartridge from a drive that protects against reading and writing errors which may occur when the cartridge is moved while the drive is reading or writing.

Briefly, this object as well as other objects of the current invention is accomplished in an overwrite protection apparatus for use in a media drive having a media cartridge inserted therein. The overwrite protection apparatus comprises: a read/write head for reading and writing to the media cartridge; and a read-write protection switch in electrical communication with the read/write head. The read-write protection switch generates an electrical signal upon movement of the media cartridge that disables the read/write head.

According to another aspect of the invention, there is disclosed herein a removable media cartridge for use with a disk drive wherein the drive has a sliding lever cooperating with a read/write protection switch that electrically enables and disables the drive read/write heads. The media cartridge comprises: a push member situated substantially exterior to the drive for accepting an exterior applied force; and an abutment surface cooperating with the sliding lever so as to cause the read-write protection switch to change "on/off" states upon movement of the abutment surface.

According to another aspect of the invention, there is disclosed herein a method of misread and overwrite protection for errors caused by movement of the media cartridge. The media cartridge has a storage medium and a cartridge shell. The method comprises the steps of: detecting movement of the cartridge shell; disabling read/write heads; identifying whether the media drive was in the process of reading from or writing to the media cartridge; if the media drive was writing to the storage medium when the cartridge shell is moved, generating a write fault interrupt; and if the media drive is reading from the storage medium when the cartridge shell is moved, generating a read fault interrupt.

Other aspects and features of the invention are described below.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 1D is an enlarged view of a portion of a media drive according to the present invention with no cartridge inserted therein;

FIG. 2D is a side view of an inventive cartridge;

FIGS. 3A and 3B show the operation of the cartridge retention mechanism in accordance with the present invention;

FIGS. 4A and 4B show the operation of the inventive cartridge with the read/write protection apparatus during an initial stage of inserting the cartridge into the drive;

FIGS. 5A and 5B show the operation of the inventive cartridge with the read/write protection apparatus during an intermediary stage of inserting the cartridge into the drive;

FIGS. 6A and 6B show the operation of the inventive cartridge with the read/write protection apparatus when properly situated for operation in the drive;

FIGS. 8A and 8B show the operation of the inventive cartridge with read/write protection apparatus during an intermediary stage of ejecting the cartridge from the drive;

DETAILED DESCRIPTION OF PREFERRED EMBODIMENT

Figure 1A:
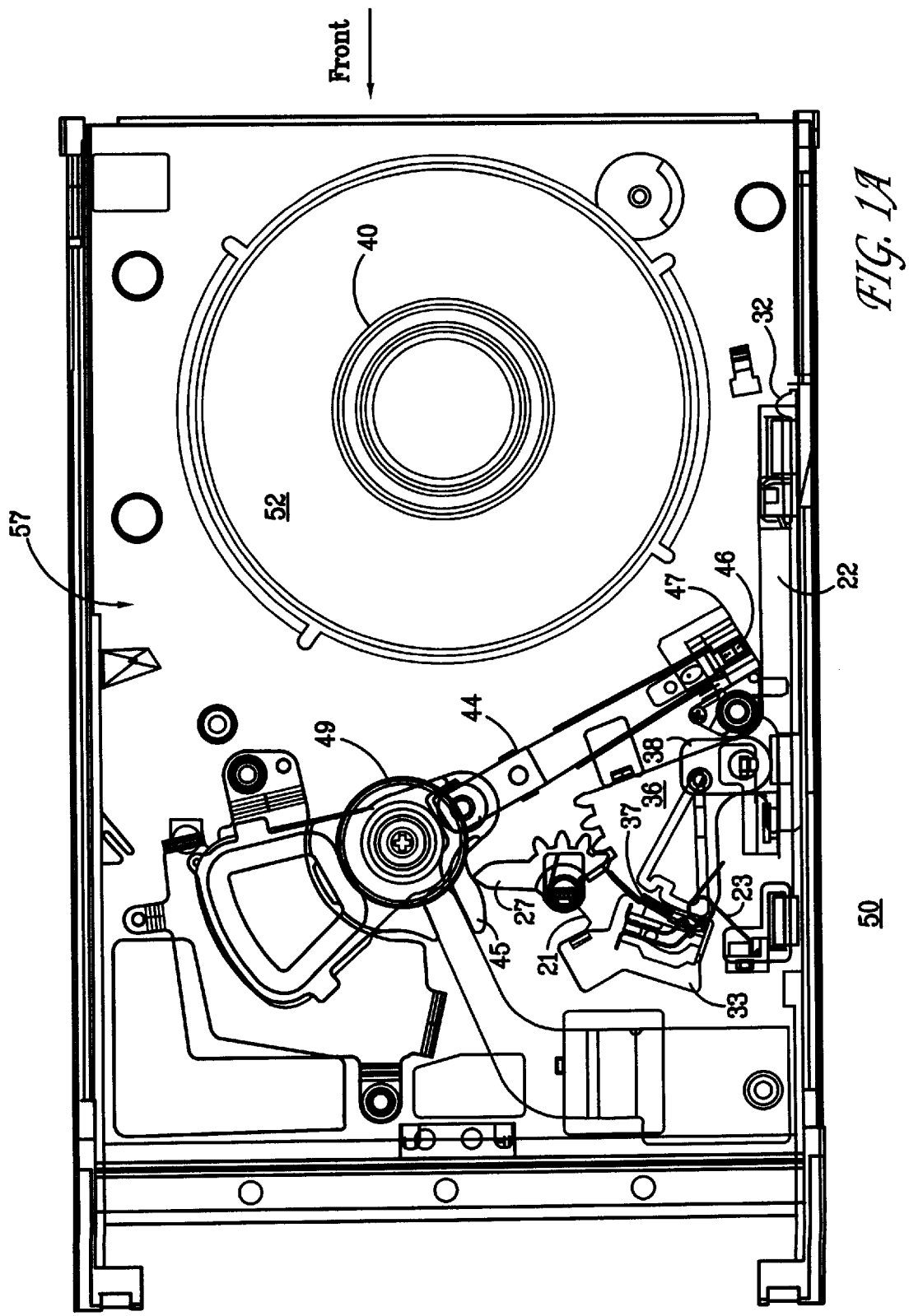
FIG. 1A is a top plan view of a media drive according to the present invention with no cartridge inserted therein.

A novel method of ejecting a media cartridge from a media drive comprises applying a force to a portion of the media cartridge that is exterior to the drive so as to move the cartridge further into the drive. Movement of the cartridge into the drive has the effect of disengaging the cartridge from the drive and thereby allows for removal of the cartridge from the drive. Thus, ejection of the cartridge from the drive is effected by pushing on an exterior edge of the cartridge rather than on a button or some other switch located on the drive.

Although it represents a great advancement in the art, this novel method for ejecting a media cartridge is not without difficulties. A design difficulty associated with an exterior force or push-type ejection system involves avoiding read and write errors that potentially could result when the exterior "push" pressure is applied to the cartridge. In "push" type systems, ejection of a cartridge is effected by applying an exterior force to the cartridge, typically in the direction inward toward the drive opening. The cartridge moves inward into the drive opening in reaction to the applied force. Movement of the cartridge presents the possibility of interfering with any writing to or reading from the cartridge media that may be in progress when the exterior force is applied. For example, if the drive is writing to the media and the cartridge is disturbed, movement of the media may cause writing to occur in an unintended portion of the media. Similarly, if a cartridge is disrupted sufficiently to move the storage media when the drive is reading from the media, an error may occur in the reading process. In fact, any movement of the cartridge, even those that are unintentional and not intended to eject the cartridge could interfere with the reading from and writing to the media. Thus, there is a need in systems that employ a push type ejection method, to protect against write and read errors caused by exterior movement of the cartridge.

The present system provides an inventive method and drive apparatus as well as a novel media cartridge for protecting against overwrite and misread. This invention prevents overwrite and misread of the media caused by intended and unintended movement of the cartridge by including an electromechanical switch on the cartridge eject mechanism which signals the drive's controlling electronics that a cartridge eject has begun. The controlling electronics disable the current required to write to the media. The disabling of the write current is accomplished by means of combinational logic and therefore occurs within a few nanoseconds of the eject detection. The eject detection signal also notifies the microprocessor that a cartridge eject has occurred and under firmware control the host system will be notified of the cartridge ejection. It should be noted that although the aspects of the invention are described in the context of an intentionally applied force to effect an ejection of the cartridge, the description of the misread and overwrite protection applies as well to movements due to inadvertent movement of a cartridge. For example, a force may be accidentally applied to the cartridge that causes the cartridge to be moved into the drive. In such a situation, the present system provides misread and overwrite protection.

FIG. 1A is a top view of the inventive disk drive 50 with its top cover removed and the components moved from their relative operational positions for clarity. Drive 50 comprises a chassis 57, an actuator 49 (preferably a rotary actuator), including an opposing pair of load beams 44 having a read/write head 46 disposed at the end of each load beam, a spindle motor 52 and a spindle 40, a load ramp 47, a shutter opening arm (not shown), and a load/eject mechanism which includes pinion 36, read-write protection switch 33, gear 27, sliding lever 22, and lever compression spring 23. A disk cartridge can be inserted into the front of the drive in the direction indicated by the arrow. During insertion, the cartridge slides linearly along the top surface of chassis 57 and spindle motor 52 for engagement with the read/write heads 46. A system for disk cartridge hub engagement with the drive is described more fully in co-pending patent application Ser. No. 08/920,932 entitled "MEDIA HUB MOUNTING SYSTEM FOR MINIMIZING Z-AXIS TRANSLATION" filed Aug. 29, 1997, which is hereby incorporated by reference in its entirety.

Figure 1B:
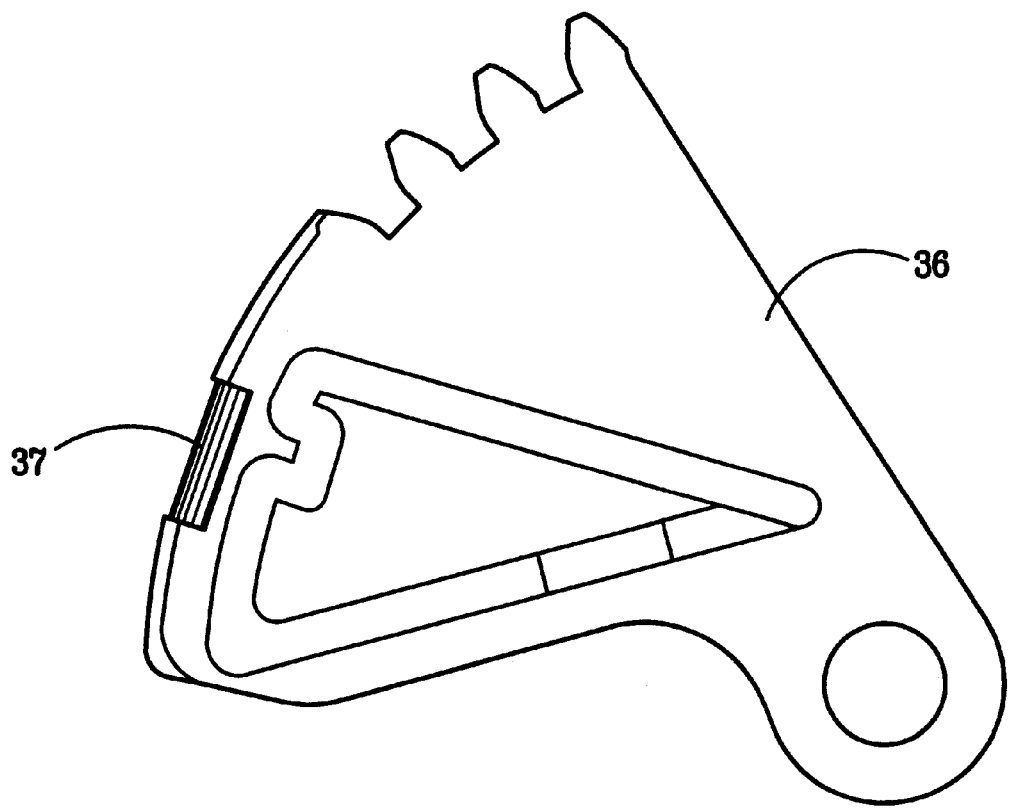
FIG. 1B is an enlarged view of a pinion with a conductor.

FIG. 1B provides an enlarged detailed view of pinion 36 shown in FIG. 1. Pinion 36 has an electrical conductor 37 located along its perimeter. As described in further detail below, pinion 36 rotates when cartridge 10 is inserted into and removed from drive 50. Conductor 37 located on the perimeter of pinion 36 likewise rotates. When cartridge 10 is inserted into drive 50 and is appropriately situated within the drive, conductor 37 will have been rotated into contact with read-write protection switch 33. As described below, contact between conductor 37 and switch 33 has the effect of enabling read/write heads 46. Of course, if cartridge 10 is pushed again so as to eject cartridge 10, the electrical contact between conductor 37 and switch 33 is broken and read/write heads 46 are disabled.

Figure 1C:
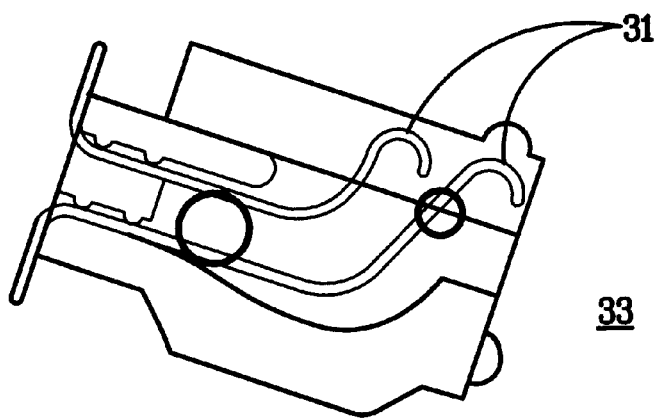
FIG. 1C is an enlarged view of a read-write protection switch.

FIG. 1C presents an enlarged isolated view of read-write protection switch 33. Read-write protection switch 33 comprises two electrical contacts 31 which are biased in an outward position relative to the base of switch 33. When pressure is applied to electrical contacts 31, electrical contacts 31 are displaced inward toward the base of read-write protection switch 33. When an electrically conducting member comes in contact with both electrical contacts 31, an electrical circuit is completed and switch 33 is said to be "on." Thus, read-write protection switch 33 can be turned on or placed in a conducting state by placing an electrically conducting material such as that disposed on the perimeter of pinion 36 between electrical contacts 31. Conversely, read-write protection switch 33 is turned "off" by removing a conducting material from between contacts 31. In the presently preferred embodiment, switch 33 outputs a logical low signal when in the "on" state and logical high when in the "off" state. As described in further detail below, read-write protection switch 33 output signal is transmitted to ASIC 108 which through combinational logic deactivates read/write heads 46 when appropriate. Thereafter, ASIC 108 takes various clean-up steps such as error generation to insure continued smooth operation of the drive.

FIG. 1D provides an enlarged view of the read-write protection switch 33 portion of the drive shown in FIG. 1A. As shown, when cartridge has not been inserted in drive 50, pinion 36 is positioned so that electrical conductor 37 does not contact electrical contacts 31 of read-write protection switch 33. In the pictured situation, read/write heads 46 are disabled.

Figure 2A:
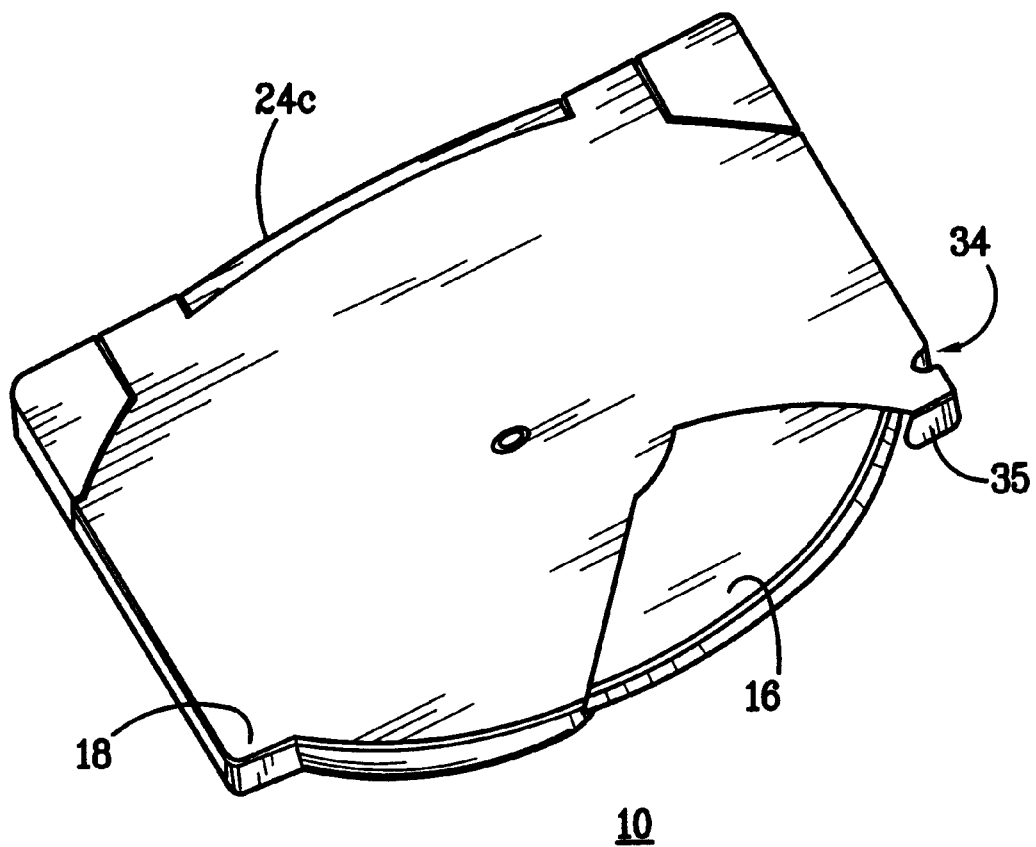
FIG. 2A is a perspective view of an inventive cartridge.
Figure 2B:
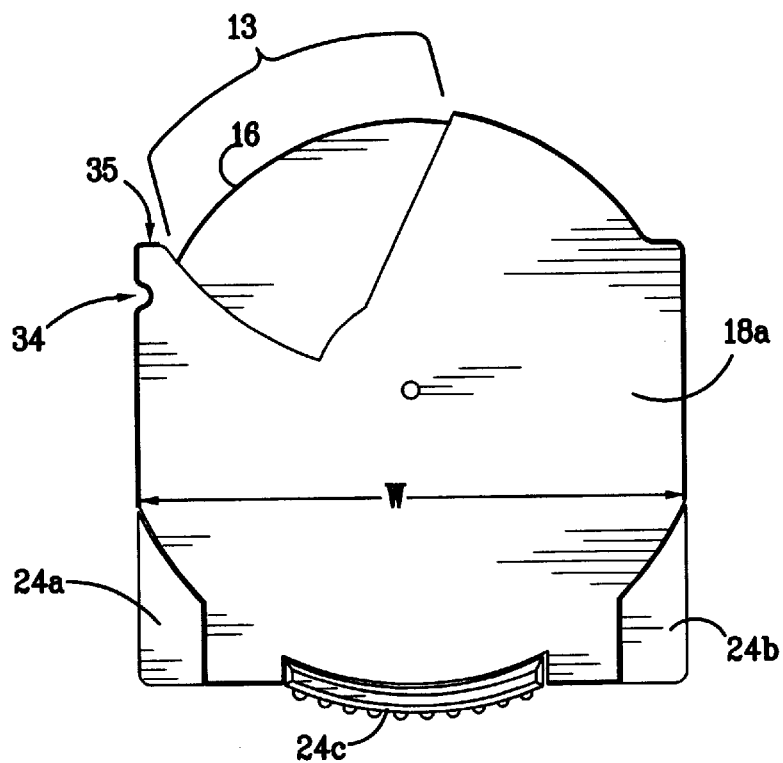
FIG. 2B is a top view of an inventive cartridge.
Figure 2C:
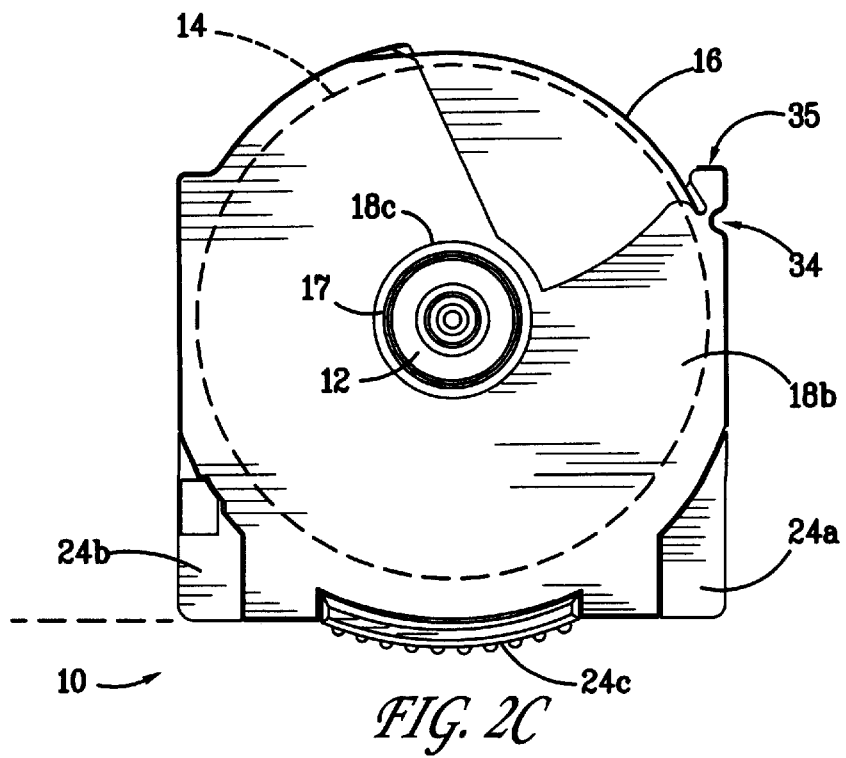
FIG. 2C is a bottom view of an inventive cartridge.

FIGS. 2A through 2D provide various views of inventive media cartridge 10 for use with drive 50. FIG. 2A provides a top perspective view of inventive cartridge 10. FIGS. 2B and 2C present top and bottom views of cartridge 10. FIG. 2D provides a side view of cartridge 10. Cartridge 10 comprises a flexible magnetic read-write media or disk 14 (identified in broken lines), a disk media hub 12, top and bottom cartridge shell halves 18a and 18b, a rotary shutter 16, and a shutter pivot pin. Shutter 16 rotates within cartridge 10 between an open position and a closed position. In the open position, shutter 16 is rotated away from a generally wedge shaped disk access opening 13 that is formed in cartridge shell 18, exposing the top and bottom surfaces of disk 14 for access by a read/write head or heads contained within a disk drive. In the closed position, shutter 16 is rotated over disk access opening 13, sealing disk cartridge 10 and protecting disk 14. The flexible magnetic disk 14 is formed of a thin polymer film, such as MYLAR, and has a thin magnetic layer uniformly dispersed on the top and bottom surfaces. The magnetic surfaces magnetically sensitize the flexible disk 14 and enable the storage of digital data when the surface is brought into magnetic communication with a magnetic transducer of the type commonly found in disk drives. Disk 14 is generally circular with a circular hole 17 proximate the center of disk 14.

Media hub 12 is firmly secured to disk 14 such that the center of hub 12 is aligned proximate the center of disk 14. Media hub 12 is preferably attached to disk 14 via a well-known adhesive process. The disk and hub assembly are rotatably disposed between upper and lower cartridge shell halves 18a, 18b. Lower cartridge shell half 18b has a substantially circular spindle access opening 18c such that a disk drive can provide rotational power to disk 14 via hub 12. Preferably, said access opening presents a rounded edge.

Cartridge shell 18 also comprises a side cut-out 34 and abutment surface 35. As explained more fully below, cut-out 34 and abutment surface 35 engage sliding lever 22 during cartridge insertion and ejection. Cut-out 34 functions to retain the cartridge in drive 50 and ensure proper cartridge insertion while abutment surface 35 provides a flat surface for engagement and spring loading of sliding lever 22.

A push member 24c is disposed on a rear exterior edge of cartridge 10. Push member 24c extends away from surrounding edge areas 24a, 24b of cartridge 10. By projecting away from surrounding edge areas 24a, 24b, push member 24c provides an ergonomic location to apply insertion forces on cartridge 10. Users of cartridge 10 intuitively apply a force to push member 24c rather than the surrounding areas. The location and design of member 24c concentrate operator applied forces towards the center of cartridge 10 so that the applied forces move cartridge 10 in and out of drive 50 rather than side to side. Preferably push member 24c provides an arcuate surface to encourage application of force toward the cartridge center. In a preferred embodiment, push member 24c has a raised design applied to its exterior edge so as to prevent slipping when applying force to member 24c and to further indicate to operators that a force should be applied to push member 24c as opposed to other portions 24a, 24b of the cartridge edge.

Cartridge 10 is specially designed so that cartridge shell 18 and read/write media 14 located within cartridge 10 are to a limited extent isolated from each other so that shell 18 can be moved relative to read/write media 14. Referring to FIG. 2C, spindle access opening 18C is slightly larger in diameter than media hub 12. Thus, shell 18 can be moved independent of media 14 for a distance equivalent to the difference in diameters between the access opening 18C and media hub 12. As described below, this relative freedom of motion allows for shell 18 to be moved sufficiently to interact with pinion 36 and read-write protection switch 33 without moving read/write media 14. When the limited range of freedom is exhausted and media 14 begins to move with shell 18, read/write heads 46 of drive 50 will have been disabled.

Referring to FIGS. 3A and 3B, the interaction between cartridge 10 and sliding lever 22 of drive 50 is illustrated. Sliding lever 22 comprises a flexible arm 23 with a protuberance 32 proximate the distal end. Flexible arm 23 comprises a flexible material that bends with the application of a sidewards force. Moreover, protuberance 32 has a shape, preferably cammed, that is adapted to engage the front corner 35 of cartridge 10 and to facilitate sidewards movement of flexible arm 23. As cartridge 10 is inserted into drive 50, protuberance 32 engages the front corner 35 of cartridge 10. As a result, when a cartridge engages protuberance 32, it rides up onto and slides along the side wall 35b of cartridge 10. An opening 59 in the sidewall of chassis 57 provides clearance for the flexible arm 23 to flex away from cartridge 10 as cartridge 10 slides into the drive. When cartridge 10 is sufficiently far enough into drive 10, protuberance 32 aligns with cut-out 34 in cartridge 10. As cartridge 10 is inserted yet further into drive 50, abutment surface 35 of cartridge 10 contacts an end 22a of sliding lever 22, thereby urging sliding lever 22 to slide in tandem with cartridge 10 as cartridge 10 continues into drive 50. As cartridge 10 moves further into drive 50, sliding lever 22 slides from a position proximate the line "A" to a position proximate the line "B". At this point, flexible arm 23 has moved into chassis 57 past sidewall opening 59 thereby constraining flexible arm 23 by the chassis sidewall. Because the sidewards movement of flexible arm 23 is thus constrained, cartridge 10 is locked into drive 50. Furthermore, the insertion force on cartridge 10 and sliding lever 22 compressively loads spring 23.

FIGS. 4A through 11 provide views of cartridge 10 at various stages of insertion into drive 50 so as to illustrate the method and apparatus for ejection and overwrite protection. From a user's standpoint, cartridge 10 is loaded into operating position in drive 50 by pushing cartridge 10 forward into drive 50 and then releasing the cartridge. Cartridge 10 is ejected from drive 50 by again pushing cartridge 10 forward into drive 50 and releasing. The load eject mechanism that provides this user interface comprises the sliding lever 22, pinion 36, and gear 27. Pinion 36 comprises teeth 36a, and race 26. In addition to the details provided above, sliding lever 22 comprises an ear 39 with a post 38 projecting downwardly from ear 39 and into race 26 of pinion 36. Gear 27 comprises a coil spring 21, latch 28, and teeth 27a. Teeth 27a engage teeth 36a of pinion 36, and latch 28 provides a mechanism to lock actuator 49 in a retracted position when not in operation. As noted earlier, an electrical conducter 37 located on the perimeter of pinion 36 interacts with read-write protect switch 33 to control current to the read/write heads and thereby prevent reading and writing errors potentially caused by movement of cartridge 10.

Figure 4A:
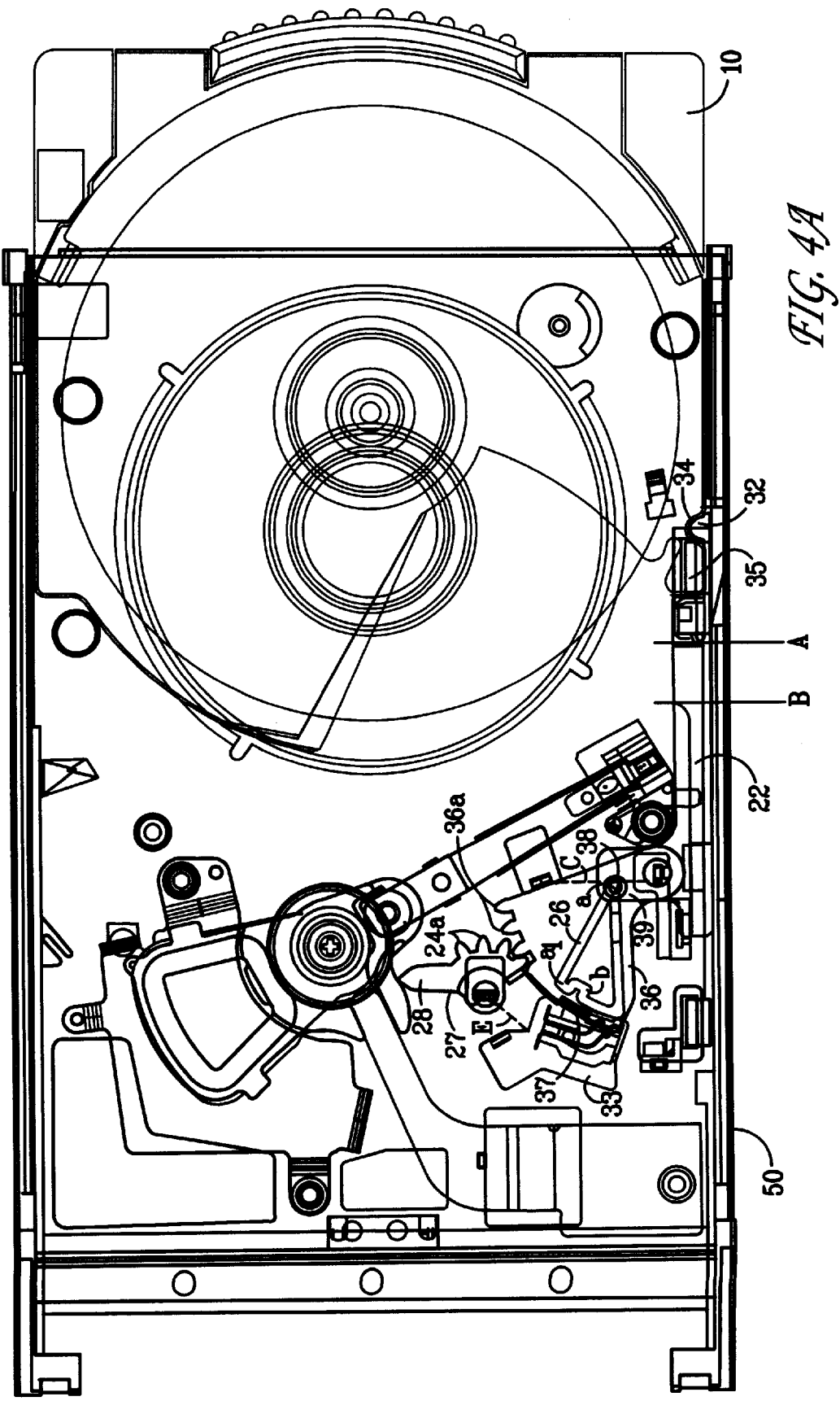

FIG. 4A provides a perspective view of cartridge 10 in an initial stage of insertion into drive 50 such that the inner components of drive 50 are at the initial stages of engagement. FIG. 4B provides a detailed enlarged view of the area of drive 50 containing read-write protection switch 33. As shown, cartridge 10 has been pushed far enough into drive 50 such that protuberance 32 has engaged cut-out 34 in cartridge 10. At this point, cartridge abutment surface 35 has engaged sliding lever 22, which is in a position proximate the line "A". Pinion 36 is in a rotary position proximate the line "C" and gear 27 is in a rotary position proximate the line "E". Post 38 of sliding lever 22 is in race 26 proximate location "a". In this initial stage of insertion, electrical conductor 37 on the perimeter of pinion 36 is not engaged with electrical contacts 31 of read-write protection switch 33. As cartridge 10 is pushed into drive 50, cartridge 10 urges sliding lever 22 from a position proximate line "A" to a position proximate line "B", moving post 38 along race 26 from a point proximate "a" to a point proximate "b".

Figure 5A:
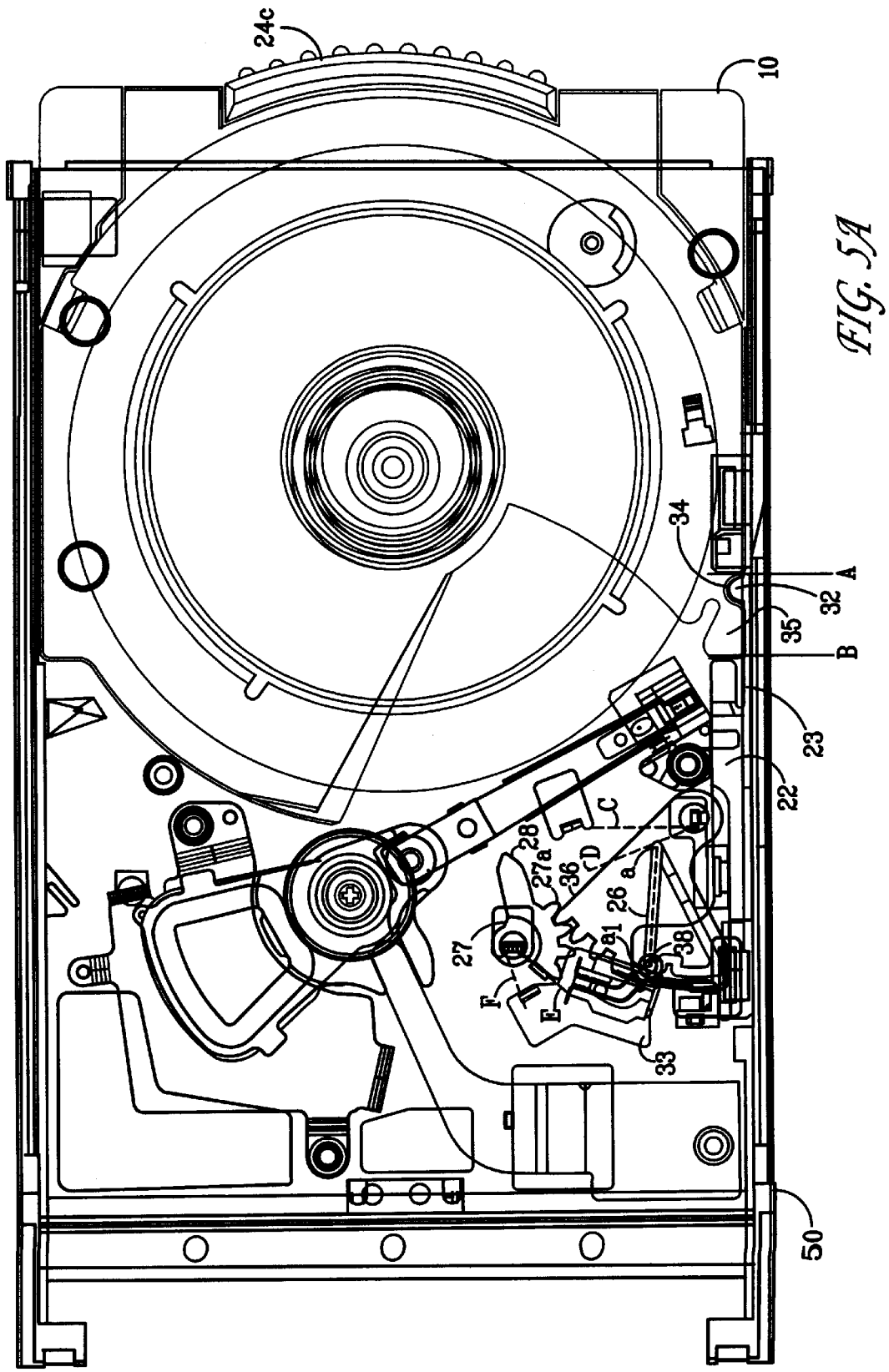

FIGS. 5A and 5B show cartridge 10 in an intermediary insertion location with post 38 positioned at point "a1." The inward pressure on push member 24c causes post 38 to travel along the path indicated by the dashed lines in race 26. The movement of post 38 along race 26 provides a rotational force to pinion 36 causing it to rotate counter-clockwise from a position proximate line "C" to a position proximate line "D". Simultaneously, as sliding lever 22 travels further into drive 50, spring 23 is loaded. While pinion 36 rotate, teeth 36a engage teeth 27a, rotating gear 27, against the bias of spring 21, from a position proximate line "E" to a position proximate line "F". Just as cartridge 10 travels past its operating position, post 38 engages the end of the first leg of race 26 at point "a1," preventing further forward travel of post 38. Because post 38 cannot travel further forward, sliding lever 22 and cartridge 10 cannot move forward, signaling the user that cartridge 10 has been pushed fully into drive 50. Electrical conductor 37 on the perimeter of pinion 36 has rotated beyond electrical contacts 31 of read-write protection switch 33. Thus, at this intermediary stage of insertion of cartridge 10 into drive 50, read-write heads 46 of drive 50 are not enabled. When the user releases cartridge 10, spring 23 biases post 38 to travel within race 26 from point "a1" to point "b" where it comes to rest with cartridge 10 locked in the operating position.

Figure 6A:
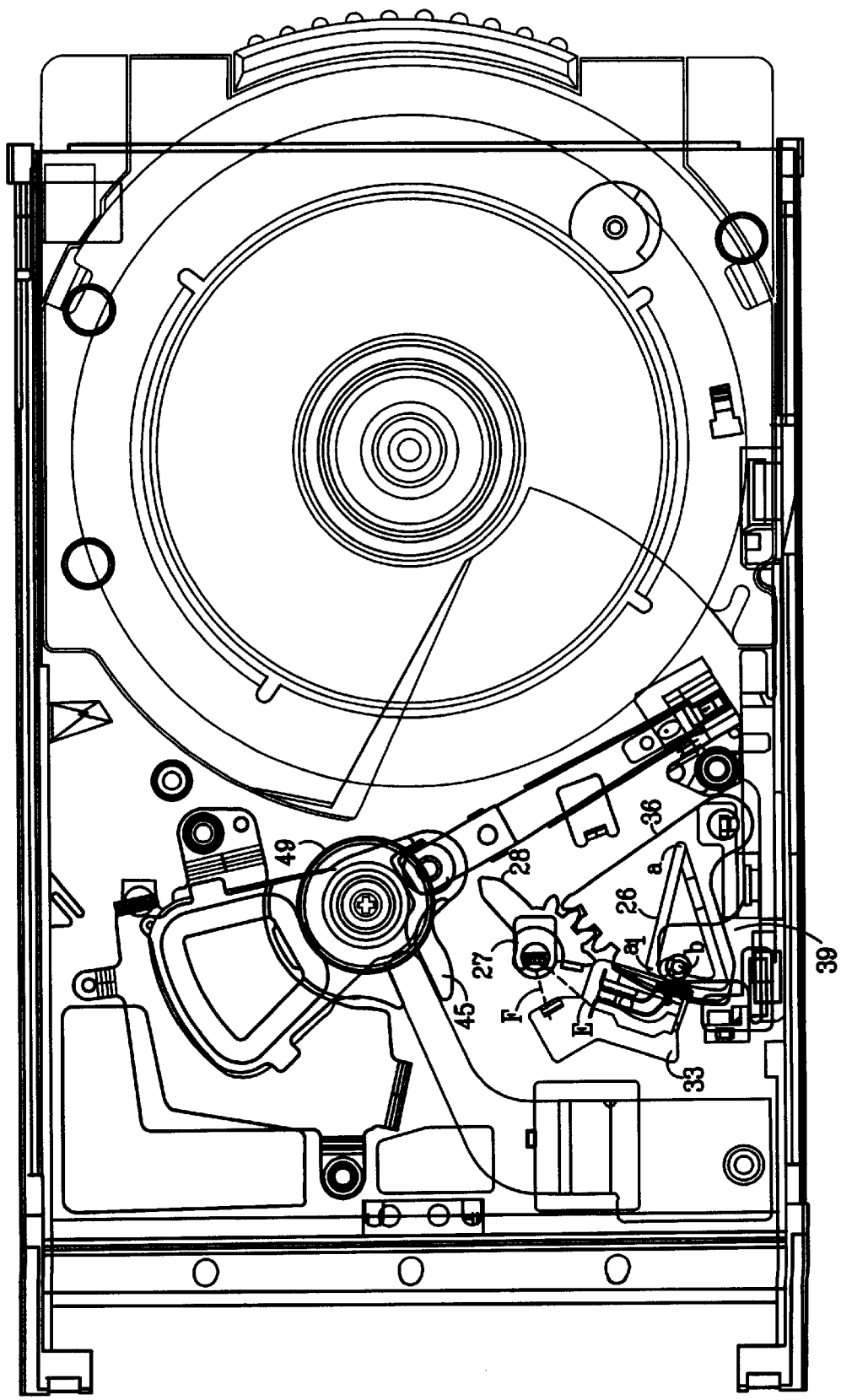

FIGS. 6A and 6B show cartridge 10 seated in its operational position with post 38 situated at point "b." Latch 28 has rotated with gear 27 away from lever 45 on actuator 49 by an amount indicated by the angle between lines "E" and "F". As a result of the rotation of latch 28, actuator 49 is free to move read/write heads 46 over the surface of disk 14. Media hub 12 is centered in the circular spindle access opening 18c of the cartridge shell 18.

As shown, when cartridge 10 comes to rest in its operational position, electrical conductor 37 on the perimeter of pinion 36 is positioned over electrical contacts 31 of read-write protection switch 33. Placing electrical conductor 37 in contact with electrical switch 33 completes an electrical circuit causing switch 33 to be turned on. A logical low signal out of switch 33 is received on an input pin to ASIC 108 (described below). If a write operation is received while the low signal is maintained on the ASIC 108 input pin, a low signal will be driven by ASIC 108 on an output pin to read/write head 46 circuitry. The low signal on ASIC 108 output pin enables writing to occur. Accordingly, as long as electrical conductor 37 remains in contact with electrical switch 33, write operations that are received will continue to be enabled through ASIC 108. However, when the electrical connection between conductor 37 and switch 33 is broken, the signal out of switch 33 and into the input pin on ASIC 108 goes high. As a consequence of the ASIC 108 logic, the output pin on ASIC 108 also goes high causing read/write head 46 to be disabled.

Figure 7:
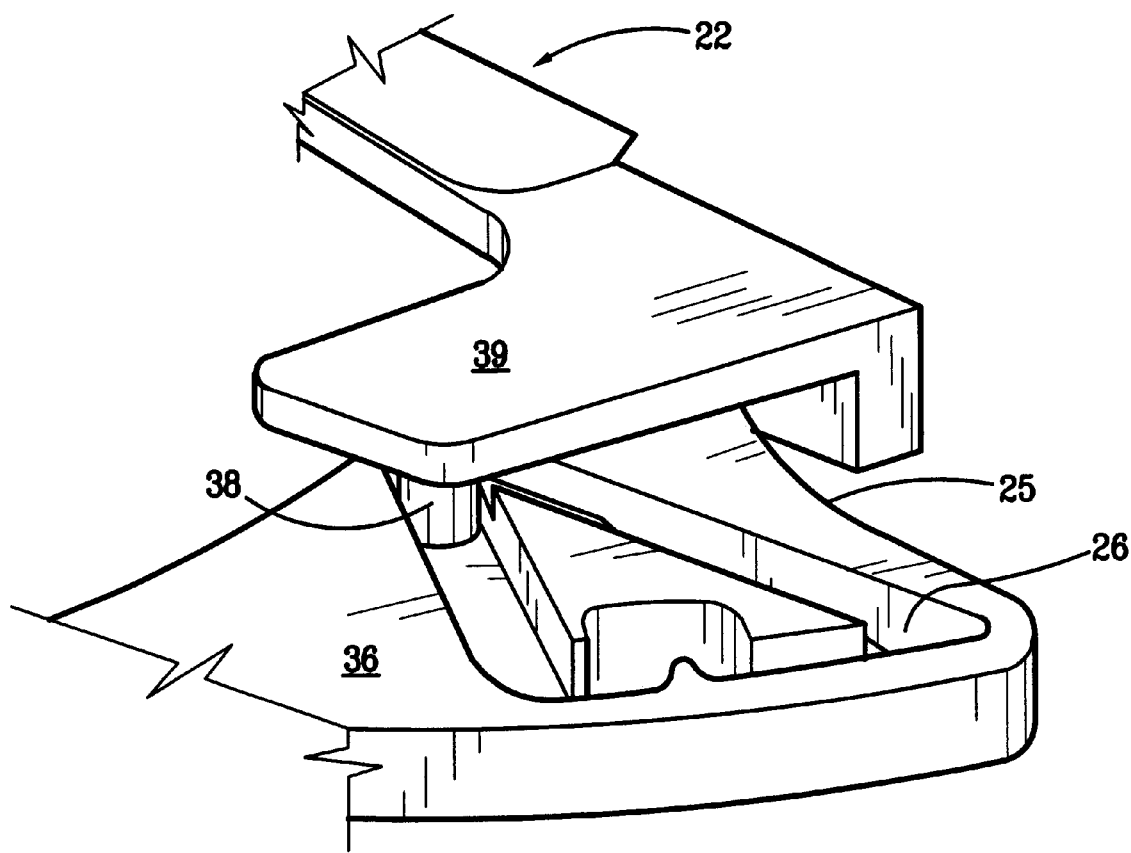
FIG. 7 shows an isometric view of pinion and sliding lever engagement.

FIG. 7 shows an isometric view of the engagement between post 38 of sliding lever 22 and race 26 of pinion 36. Race 26 is inset into pinion 36 providing a track for post 38. Post 38 projects downwardly from ear 39 of sliding lever 22 into race 26. Ramp 25 in race 26 helps control the direction of travel of post 38 in race 26, ensuring that post 38 can only travel around race 26 in a counter-clockwise direction.

Figure 8A:
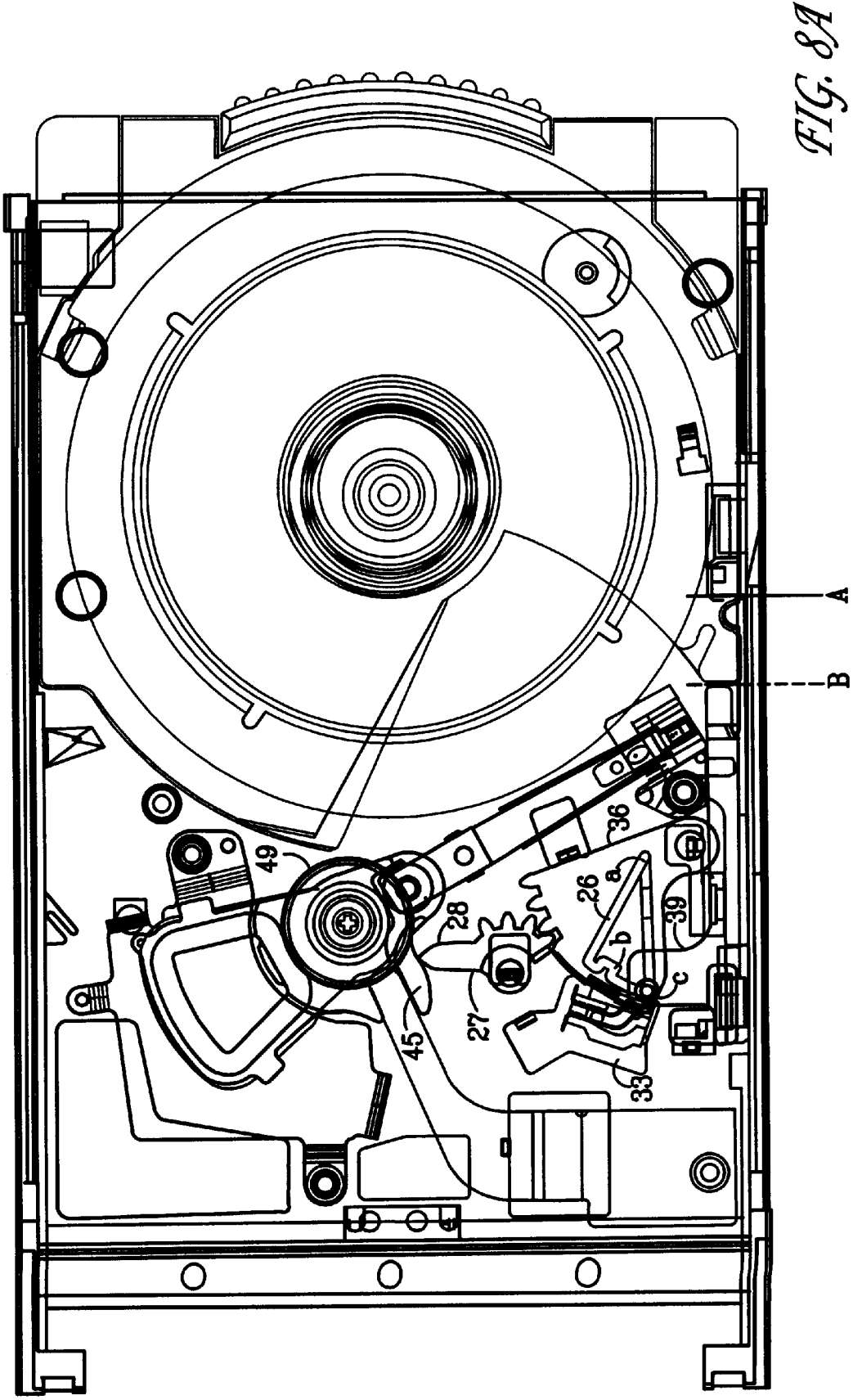

Disk ejection is reversed from the insertion process described above. To start the ejection, a user once again pushes cartridge 10 forward into drive 50. The forward movement of cartridge 10 moves sliding lever 22 into drive 50. Referring to FIGS. 8A and 8B, this forward movement of lever 22 moves post 38 in race 26 from a point proximate "b" to a point proximate "c." Simultaneously, pinion 36 is free to rotate clock-wise with the aid of spring loaded gear 27. At this point, forward movement of cartridge 10 is once again constrained, indicating to the user to stop pushing on cartridge 10.

As shown, electrical conductor 37 along the perimeter of pinion 36 is not in contact with electrical contacts 31 of read-write protection switch 33. Thus, the signal out of read-write protection switch 33 changes to a logical high, causing read/write heads 46 to be disabled. It should be noted that read-write switch 33 will turn off immediately when the electrical conductivity between conductor 37 and electrical leads 31 of switch 33 is broken.

As noted above and as can be seen from the relative positions of media hub 12 and spindle access opening 18c, cartridge shell 18 can be moved relative to media 14. Thus, shell 18 may move in reaction to an exterior force while media 14 which is held by drive spindle 40 remains stationary. The relative movement between shell 18 and media 14 is sufficiently large such that shell 18 may be moved inward as described above a sufficient distance to break the electrical contact between conductor 37 and read-write protection switch 33 while media 14 remains stationary. Of course, media 14 will eventually begin to move in tandem with shell 18 but only after read-write heads 46 have been disabled.

As the user stops pushing on cartridge 10, spring 23 biases sliding lever 22 from a point proximate line "B" to a point proximate line "A", as post 38 moves down race 26 from point proximate "c" to point proximate "a". The spring force applied to sliding lever 22 also provides a force to eject cartridge 10 from drive 50. Meanwhile, as spring 21 rotates gear 27 counter-clockwise, latch 28 moves actuator 49 to a parked position via lever 45. The heads are parked by moving load beams 44 and heads 46 onto load ramp 47. The mechanism for loading and unloading heads 46 is described in further detail in co-pending Patent Application Ser. No. 08/920,594 entitled "SCISSORING LOAD RAMPS FOR A REMOVABLE MEDIA DISK DRIVE" filed Aug. 29, 1997, which is hereby incorporated by reference in its entirety.

Figure 9:
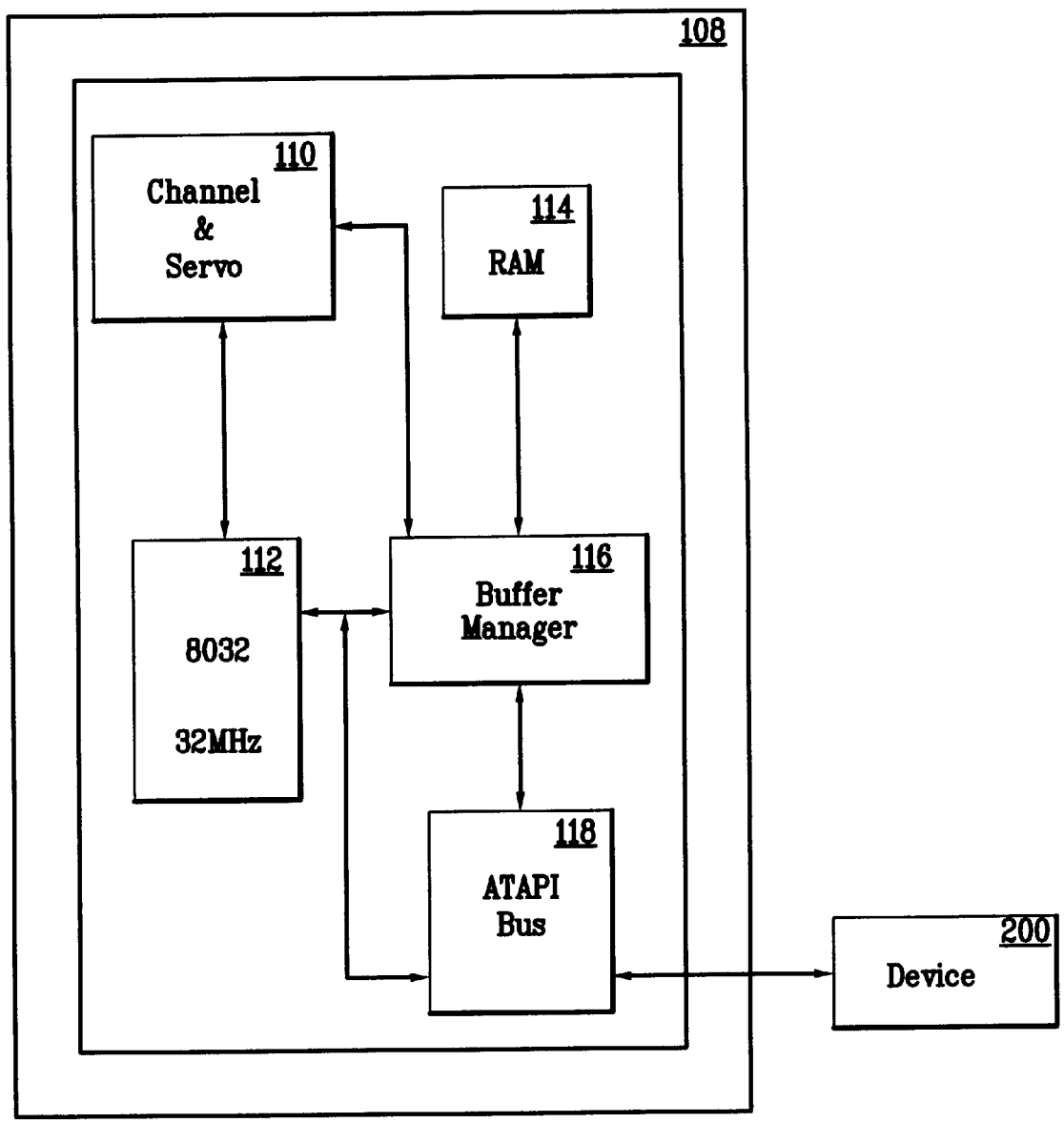
FIG. 9 is a block diagram of the application specific integrated circuit in accordance with the present invention.

FIG. 9 is a simplified block diagram of application specific integrated circuit (ASIC) 108 embodied in media drive 50. ASIC 108 comprises a channel and servo controller 110 for controlling the movement of the drive read/write heads; a microprocessor 112 for controlling the overall device operation including overwrite protection; a memory 114 for use in executing the various procedures of the drive; a buffer manager 116 for managing memory and data flow; and a bus interface 118 for communicating with an external device. ASIC 108 is electrically connected to read-write protection switch 33. When read-write protection switch 33 is turned on, indicating that cartridge 10 is properly situated in drive 50, a logical low signal is transmitted to an input pin of ASIC 108. As a result of the combinational logic of ASIC 108, if a write operation is received while switch 33 is turned on, a logical low signal will be driven by ASIC 108 on an output pin connected to read/write head 46 circuitry. The low signal on this particular output pin of ASIC 108 causes the current to read/write heads 46 to be enabled. Of course, when read-write protection switch 33 is off, indicating a break in the conductivity between conductor 37 and switch 33, a logical high signal is generated by switch 33 and received on the input pin of ASIC 108. Again, as a result of the combinational logic of ASIC 108, when this particular input pin goes high, the output pin of ASIC 108 also goes high causing the current to read/write heads 46 to be disabled. Thereafter, ASIC 108 implements several "cleanup" operations as described below to insure continued smooth drive operation.

Figure 10:
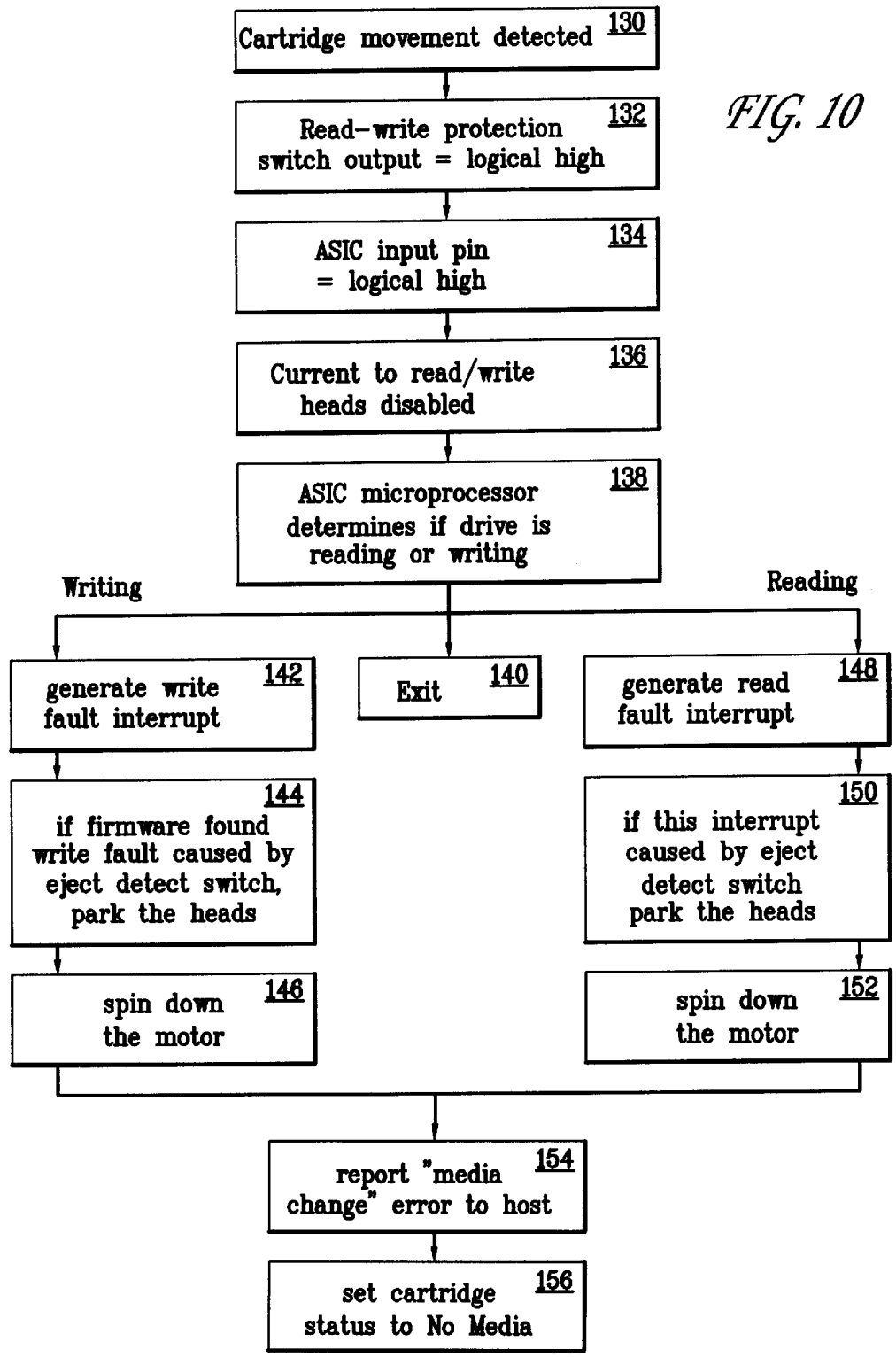
FIG. 10 is a flow diagram of the inventive method of overwrite protection.

FIG. 10 is a flow chart of the misread and overwrite protection process. For purposes of illustration, it is assumed that cartridge 10 is securely seated within drive 50. Therefore, any write operations received will be enabled by ASIC 108. At step 130, when an exterior force is applied to cartridge 10 so as to move cartridge 10 into drive 50, electrical contact is broken between conductor 37 and read-write protection switch 33. As a result, at step 132, a logical high signal indicating a break in electrical conductivity is output from switch 33. At step 134, the logical high signal is received at ASIC 108 input pin. As a consequence of the combinational logic of ASIC 108, a logical high signal is generated on ASIC 108 output pin. The logical high on ASIC 108 output pin causes current to read/write heads 46 to be terminated at step 136 thereby ceasing any write operations that may be in progress. Thereafter, at step 138 the ASIC microprocessor determines whether drive 50 was in the process of writing or reading when the cartridge movement was detected. If drive 50 was neither writing nor reading, no further processing is necessary and at step 140 ASIC 108 terminates processing of the ejection signal.

If however drive 50 was in the process of writing when cartridge 10 was pushed, at step 142 microprocessor 112 generates a write fault interrupt which causes the application specific firmware to park read/write heads 46 at step 144. At step 146, ASIC 108 causes drive motor 52 to spin down.

A similar procedure is followed when an ejection signal is received and drive 50 is in the process of reading from media 14. Under these circumstances, at step 148 microprocessor 112 generates a read fault interrupt. In response to this interrupt, at step 150 read/write heads 46 are parked. At step 152, instructions are given by microprocessor 112 to spin down motor 52.

If drive 50 is either in the process of writing or reading when cartridge 10 triggers switch 33, at step 154 microprocessor 112 transmits a media change error to host computer 200. Thereafter, at step 156, the microprocessor sets an internal variable indicating a cartridge is no longer appropriately seated in drive 50.

The present invention provides a removable media type of disk drive and a corresponding exemplary cartridge. Throughout the description, a preferred embodiment of the invention is described in connection with exemplary components. For example, a disk cartridge is shown with particular dimensions and shape, and the drive is shown having a rotary actuator. However, the particular disk drive and cartridge shown are provided only to illustrate the operation of the present invention. Accordingly, the invention should not be limited to the particular cartridge or drive embodiment shown as the invention can be employed with other cartridge and drive types and configurations. For example a different read-write protection switch could be used in the system. Also, different combinations of signals could be used to activate and deactivate the read/write heads. Thus, the above description of preferred embodiments is not intended to impliedly limit the scope of protection of the following claims.

What is claimed is:

1. A read-write protection apparatus for use in a media drive wherein the media drive accepts a media cartridge therein, comprising:

a read-write head for reading and writing to the media cartridge; and a read-write protection switch in electrical communication with said read-write head, said read-write protection switch generating an electrical signal that disables said read-write head in response to the media cartridge being removed, wherein said read-write protection switch comprises:

at lease one electrical contact, electrically connected to said read-write head; and a conducting member, said conducting member coming into contact with said at least one electrical contact when the media cartridge is in an operational position in the media drive, said conducting member breaking contact with said at least one electrical contact when the media cartridge is removed from the operational position in the media drive.

2. A read-write protection apparatus as recited in claim 1 further comprising a moveable member having said conducting member attached thereto, wherein said moveable member is situated so as to place said conducting member in contact with said at least one electrical contact when the media cartridge is in an operational position in the media drive, and said moveable member is situated so as to remove said conducting member from contact with said at least one electrical contact when the media cartridge is removed from the operational position in the media drive.

3. The read-write protection apparatus as recited in claim 2, wherein said conducting member is situated along a perimeter of said moveable member.

4. The read-write protection apparatus as recited in claim 2, wherein said moveable member is a pinion.

5. The read-write protection apparatus as recited in claim 4, further comprising a sliding lever that comes into contact with the media cartridge when the media cartridge is inserted into the media drive, said sliding lever cooperating with the pinion to move the conducting member into contact with the at least one electrical contact when the media cartridge is in an operable position in the media drive, and said sliding lever cooperating with the pinion to move the conducting member out of contact with said at least one electrical contact when the media cartridge is removed from the operable position in the media drive.

6. The read-write protection apparatus as recited in claim 5, wherein said pinion has a race therein, and further comprising a post operably attached to said sliding lever, wherein said post is moveable in said race and movement of said sliding lever causes said post to move in said race and displace said pinion.

7. The read-write protection apparatus as recited in claim 4, wherein said pinion moves in response to the media cartridge being moved into and out of the media drive.

8. The read-write protection apparatus as recited in claim 7, wherein said pinion rotates in response to the media cartridge being moved into and out of the media drive.

9. A read-write protection apparatus for use in a media drive wherein the media drive accepts a media cartridge therein, comprising:
 a read-write head for reading and writing to the media cartridge; and
 a read-write protection switch in electrical communication with said read-write head, said read-write protection switch generating an electrical signal that disables said read-write head in response to the media cartridge being removed,
 wherein said read-write protection switch comprises:
  a first electrical contact, electrically connected to the read-write head;
  a second electrical contact, electrically connected to the read-write head; and
  a conducting member, said conducting member coming into contact with said first electrical contact and said second electrical contact when the media cartridge is in an operational position in the media drive, and said conducting member breaking contact with at least one of said first electrical contact and said second electrical contact when the media cartridge is removed from the operational position in the media drive.

10. A read-write protection apparatus as recited in claim 9 further comprising a moveable member having said conducting member attached thereto, wherein said moveable member is situated so as to place said conducting member in contact with at least one of said first electrical contact and said second electrical contact when the media cartridge is in an operational position in the media drive, and said moveable member is situated so as to remove said conducting member from contact with said at least one of said first electrical contact and said second electrical contact when the media cartridge is removed from the operational position in the media drive.

11. The read-write protection apparatus as recited in claim 10, wherein said conducting member is situated along a perimeter of said moveable member.

12. The read-write protection apparatus as recited in claim 10, wherein said moveable member is a pinion.

13. The read-write protection apparatus as recited in claim 12, further comprising a sliding lever that comes into contact with the media cartridge when the media cartridge is inserted into the media drive, the sliding lever cooperating with the pinion to move the conducting member into contact with said first electrical contact and said second electrical contact when the media cartridge is in an operable position in the media drive, and the sliding lever cooperating with the pinion to move the conducting member out of contact with at least one of the first electrical contact and the second electrical contact when the media cartridge is removed from the operable position in the media drive.

14. The read-write protection apparatus as recited in claim 13, wherein said pinion has a race therein, and further comprising a post operably attached to said sliding lever, wherein said post is moveable in said race and movement of said sliding lever causes said post to move in said race and thereby displace said pinion.

15. The read-write protection apparatus as recited in claim 13, wherein said pinion moves in response to the media cartridge being moved into and out of the media drive.

16. The read-write protection apparatus as recited in claim 15, wherein said pinion rotates in response to the media cartridge being moved into and out of the media drive.

17. A read-write protection apparatus for use in a media drive wherein the media drive accepts a media cartridge therein, comprising:
 a read-write head for reading and writing to the media cartridge; and
 a read-write protection switch in electrical communication with said read-write head, said read-write protection switch generating an electrical signal that disables said read-write head in response to the media cartridge being removed,
 wherein said read-write protection switch comprises:
  a first electrical contact in electrical communication with said read-write head;
  a second electrical contact in electrical communication with said read-write head; and
  a movable member having a conducting member attached thereto, said movable member being situated so as to place said conducting member in contact with said first electrical contact and said second electrical contact when the media cartridge is in an operational position in the media drive, and said movable member being situated so as to remove said conducting member from contact with at least one of said first electrical contact and said second electrical contact when the media cartridge is removed from the operational position in the media drive.

18. The read-write protection apparatus as recited in claim 17, wherein said conducting member is situated along a perimeter of said moveable member.

19. The read-write protection apparatus as recited in claim 18, wherein said moveable member is a pinion.

20. The read-write protection apparatus as recited in claim 19, further comprising a sliding lever that comes into contact with the media cartridge when the media cartridge is inserted into the media drive, the sliding lever cooperating with the pinion to move the conducting member into contact with said first electrical contact and said second electrical contact when the media cartridge is in an operable position in the media drive, and the sliding lever cooperating with the pinion to move the conducting member out of contact with at least one of the first electrical contact and the second electrical contact when the media cartridge is removed from the operable position in the media drive.

21. The read-write protection apparatus as recited in claim 20, wherein said pinion has a race therein, and further comprising a post operably attached to said sliding lever, wherein said post is moveable in said race and movement of said sliding lever causes said post to move in said race and displace said pinion.

22. The read-write protection apparatus as recited in claim 19, wherein said pinion moves in response to the media cartridge being moved into and out of the media drive.

23. The read-write protection apparatus as recited in claim 22, wherein said pinion rotates in response to the media cartridge being moved into and out of the media drive.

24. A read-write protection apparatus for use in a media drive wherein the media drive accepts a media cartridge therein, comprising:

a read-write head for reading and writing to the media cartridge; and a read-write protection switch in electrical communication with said read-write head, said read-write protection switch generating an electrical signal that disables said read-write head in response to the media cartridge being removed, wherein said read-write protection switch comprises:

a first electrical contact in electrical communication with said read-write head;

a second electrical contact in electrical communication with said read-write head;

a pinion which rotates when the media cartridge moves into and moves out of the media drive; and a conducting member attached to said pinion, said conducting member coming into contact with said first electrical contact and said second electrical contact when the media cartridge is in an operational position in the media drive, and said conducting member breaking contact with at least one of said first electrical contact and said second electrical contact when the media cartridge is removed from the operational position in the media drive.

* * * * *